(12) United States Patent
Qian et al.

(10) Patent No.: US 6,810,397 B1
(45) Date of Patent: Oct. 26, 2004

(54) COLLECTING EVENT DATA AND DESCRIBING EVENTS

(75) Inventors: Richard J. Qian, Camas, WA (US); Eugene Epshteyn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 295 days.

(21) Appl. No.: 09/605,883

(22) Filed: Jun. 29, 2000

(51) Int. Cl.$^7$ .............................................. G06F 17/30
(52) U.S. Cl. ........................................................ 707/6
(58) Field of Search ....................... 707/1–10, 100–110, 707/103 R

(56) References Cited

U.S. PATENT DOCUMENTS

| | | | | |
|---|---|---|---|---|
| 5,729,471 A | * | 3/1998 | Jain et al. ...................... 725/131 |
| 5,832,499 A | * | 11/1998 | Gustman ................. 707/103 R |
| 6,135,881 A | * | 10/2000 | Abbott et al. ................... 463/3 |
| 6,144,375 A | * | 11/2000 | Jain et al. ................. 715/500.1 |
| 6,154,738 A | * | 11/2000 | Call ............................... 707/4 |
| 6,460,043 B1 | * | 10/2002 | Tabbara et al. ............. 707/100 |

* cited by examiner

*Primary Examiner*—Safet Metjahic
*Assistant Examiner*—Marcin Filipczyk
(74) *Attorney, Agent, or Firm*—Robert A. Diehl

(57) ABSTRACT

A method of and a system for collecting, data about an event and describing the event, which for example, might be an entertainment event, a sports event, or a political event. Identifying characteristics of the event, characteristics of types of data about the event, and a record of the event are acquired by a description generator. A person wishing to view a particular type of data utilizes an interactive receiver to select the type of data, and characteristics of the selected type of data within the record of the event are located so as to locate data of the selected type. The located data are then collected and displayed. By storing characteristics of different types of segments that occur in the event, a viewer can select segments of a particular type for viewing. Characteristics of the selected type of segments are then located within the record of the event so as to locate segments of the selected type, and the located segments are then displayed.

14 Claims, 7 Drawing Sheets

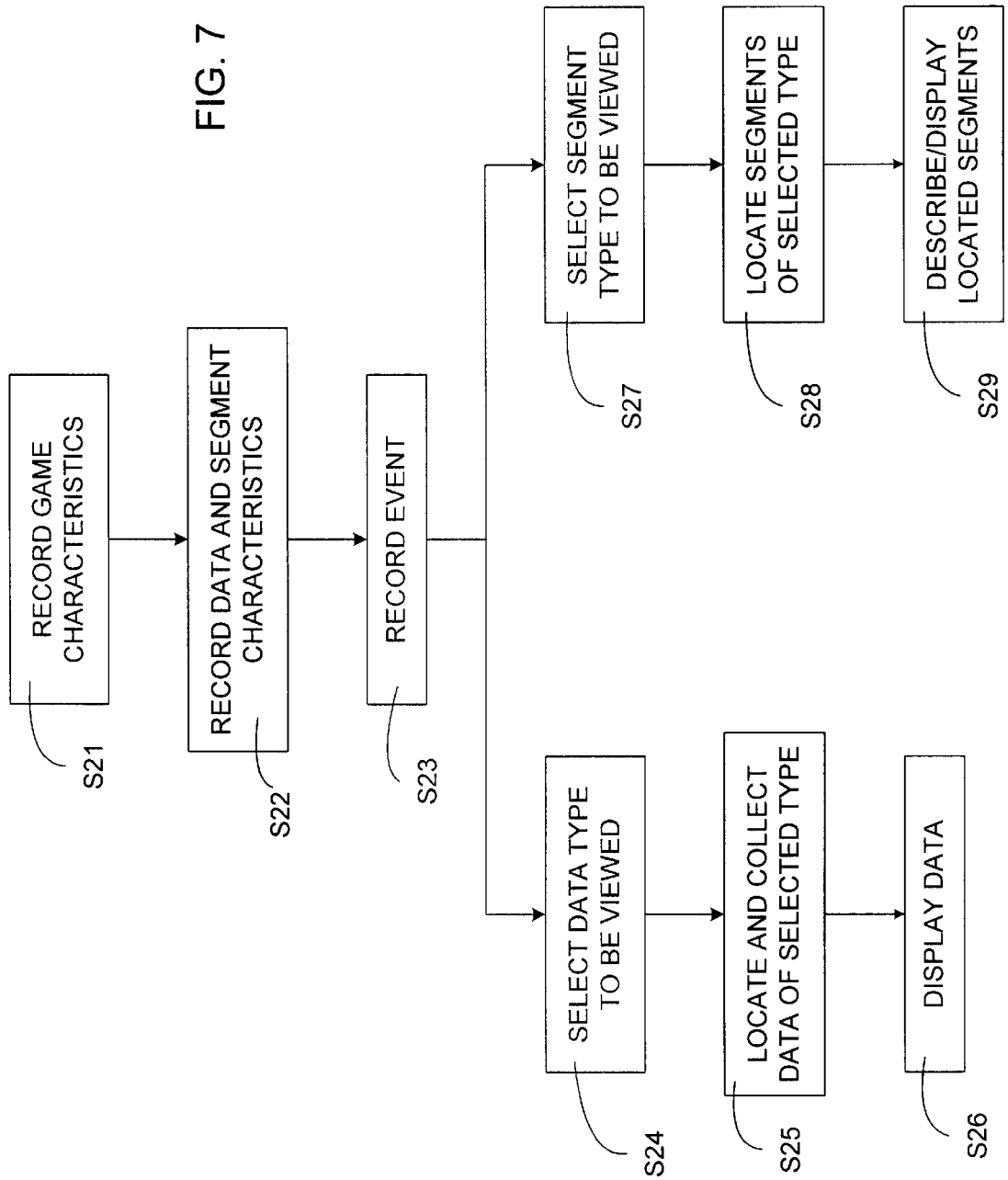

COLLECTING EVENT DATA AND DESCRIBING EVENTS

FIELD

The present invention pertains to a method of and a system for, collecting event data and describing events.

BACKGROUND

Many sports events are broadcast or recorded as they occur, making it possible for people to view such events from a remote location as they occur or at a later time. Often, some people wish to view particular types of segments in sports events. For example, a basketball enthusiast might wish to view a collection of slam dunks by a favorite basketball player in a basketball game. Likewise, some sports players might wish to view the play of other players who play the same position in the same sport as the viewer. For example, a goalie on a hockey team might wish to watch the action of another goalie who is recognized as being particularly skillful. Similarly, offensive players of one soccer team might wish to watch the play of the goalie on another soccer team so that when the first team plays that other team, the first team's offensive players might have knowledge of the opposing goalie's strengths and weaknesses. Likewise, baseball players on one team might wish to study the pitching characteristics of a pitcher on an opposing team, and football players might wish to study the play of particular players on a specific opposing team. However, watching a collection of the desired events may often require the viewer to search through several video recordings in order to find the corresponding segments. This can be time consuming, as well as requiring a large library of video recordings of various sports events. As another example, a sportswriter may review a video recording of a sports event to collect statistics of interest. However, it is extremely inefficient to watch the complete video recording of the event in order to accumulate statistics of a particular type. Likewise, a sports historian may wish to obtain comparative statistics about past sports events. It is even more inefficient to watch numerous video recordings of past sports events so as to accumulate all of the desired statistics.

In the same manner, persons interested in events of a particular type, such as entertainment events, for example circuses, or such as political events, for example political conventions, may wish to view video recordings of particular segments of such events, whether for the entertainment value, in order to study particular types of activity, or to gather statistics.

BRIEF DESCRIPTION OF THE DRAWINGS

The features and advantages of the present invention are more apparent from the following detailed description and claims, particularly when considered in conjunction with the accompanying drawings, in which like parts bear like reference numerals. In the drawings:

FIG. 7 is a flowchart depicting steps in a method of collecting, describing, and displaying event data in accordance with a preferred embodiment of the present invention.

DETAILED DESCRIPTION

Figure 1:
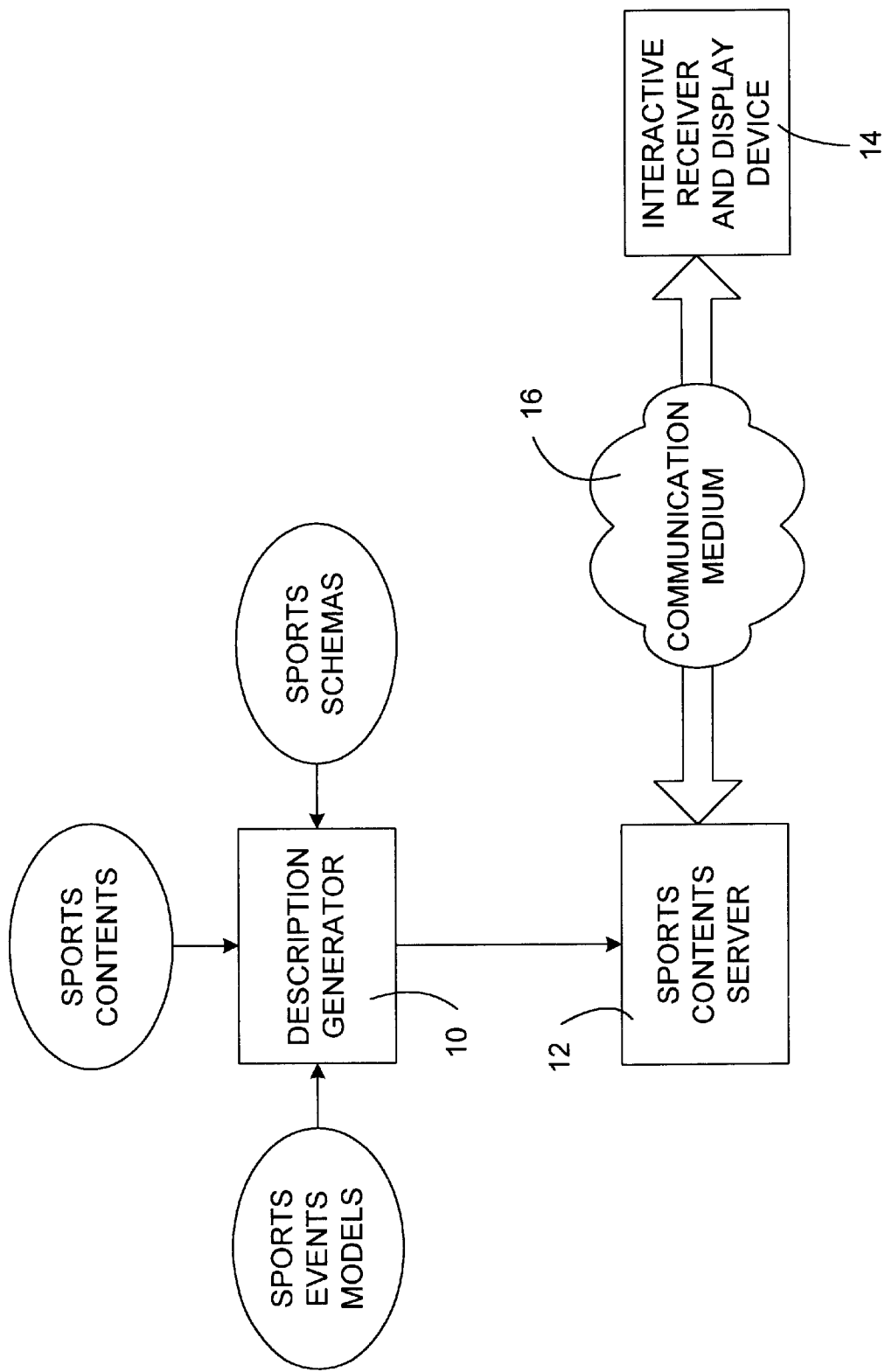
FIG. 1 is a block diagram of a first embodiment of a system for, collecting event data and describing events in accordance with the present invention.

The present invention will be described with reference to a soccer game, but this is only a representative example of the types of events for which data might be collected and the events described. As depicted in FIG. 1, a description generator 10 is provided with sports event models and sports schemas, together with sports contents. The sports contents might include video, audio, and closed captioning of a sports event, such as a soccer game. These enable description generator 10 to provide sports content descriptions of the recorded sports event to a sports contents server 12. The server may add the descriptions into a database and may also further process the description data to generate statistics. A person wishing to collect data about selected sports events activates an interactive receiver 14, which preferably includes a display device, and communicates via a communication medium 16 with sports contents server 12 to select the types of sports events for which he or she wishes to collect data. If desired, the person can be provided with a display of sport events segments including the desired data on the display device of interactive receiver 14.

Similarly, a person wanting to view selected segments from past sports events utilizes interactive receiver 14 to apply a request for segments of the selected type through communication medium 16 to server 12, causing the server to interrogate the storage medium of description generator 10 to find segments of the desired type. Server 12 then provides those segments through communication medium 16 to interactive receiver and display device 14 for display. Again, a menu of available types of segments is preferably available to the display device to permit the viewer to select the types of segments to be displayed.

Description generator 10 can be any device capable of supplying sports events models, sports schemas, and records of sports events. By way of example, description generator 10 might include a computer. Alternatively, description generator 10 can be a part of server 12. The record of the sports events can be maintained on any suitable storage medium, such as a magnetic disk. A visual record of the sports events can be provided by an image pickup device, such as a video camera, operating under control of description generator 10. Alternatively, an audio record or an alphanumeric record can be utilized. The sports events can be recorded as the events occur, or can be gathered from archived records. Interactive receiver and display device 14 might include a personal computer, a set top box with a television receiver, or a wireless hand-held device such as a Palm Pilot or a pocket personal computer. Communication medium 16 can be any suitable communication network, such as a global information network, for example the Internet.

Sports event models and sports schemas are stored in the storage medium of description generator 10. When a person wishes to obtain selected data about sports events, the person utilizes interactive receiver 14 to apply a request for selected types of data through communication medium 16 to server 12. The server then interrogates the storage medium of description generator 10 to find the desired types of data and provides them through communication medium 16 to interactive receiver and display device 14 for display. Preferably, a menu of available types of sports events data is first presented to the display device, and the viewer can then use the interactive receiver to select specific data for display.

By way of example, a viewer might query data on an Internet sports website. For example, the query might ask what player scored the winning points in a particular game, such as a championship football or basketball game. Likewise, the query might determine the amount by which a particular basketball team outscored its opponents when two key players of the team were both playing, as contrasted with when only one of them was playing or when neither of them was playing. The viewer uses interactive receiver and display device 14 to interrogate a database of sports events within the storage medium in description generator 10 or server 12, and the resulting statistics are displayed on the display device.

Figure 2:
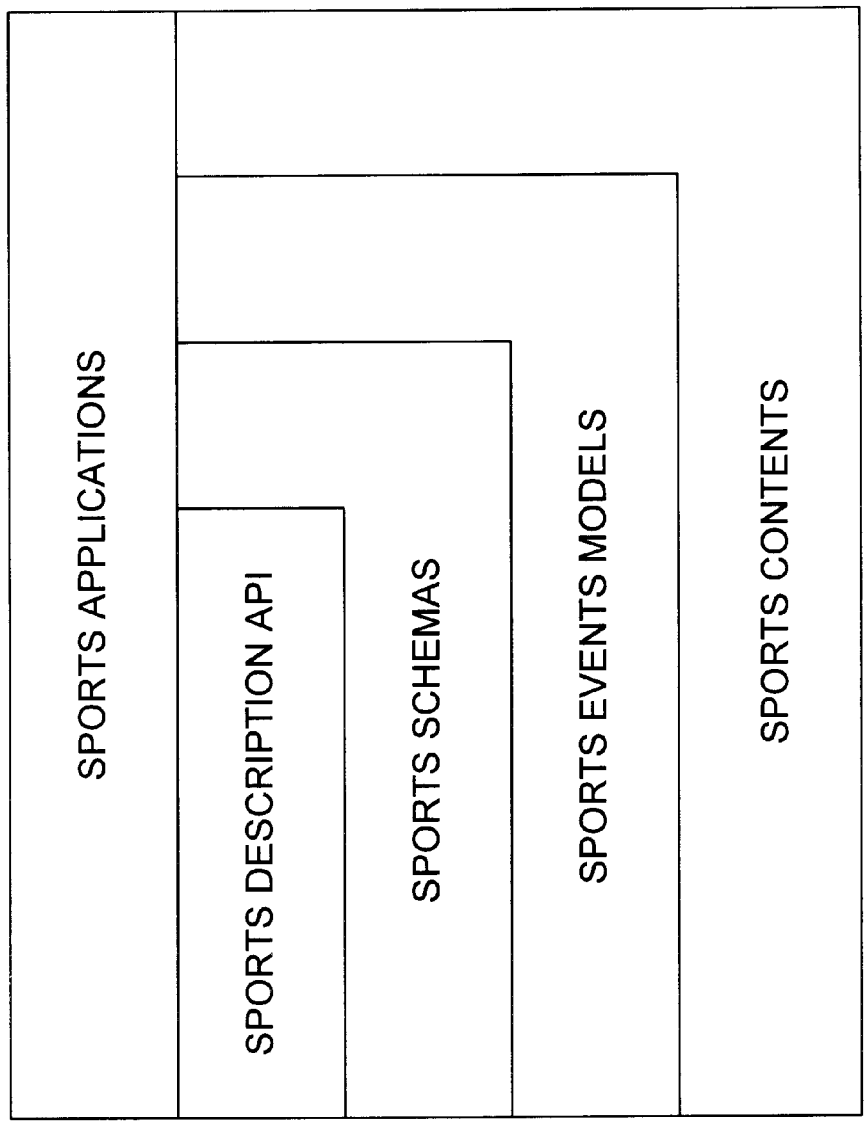
FIG. 2 is a layer diagram illustrating application of the present invention to sports events.

FIG. 2 is a layer diagram depicting the relationship between the sports contents, the sports events models, the sports schemas, and the sports description software program. These components cooperate to support sports applications.

Figure 3:
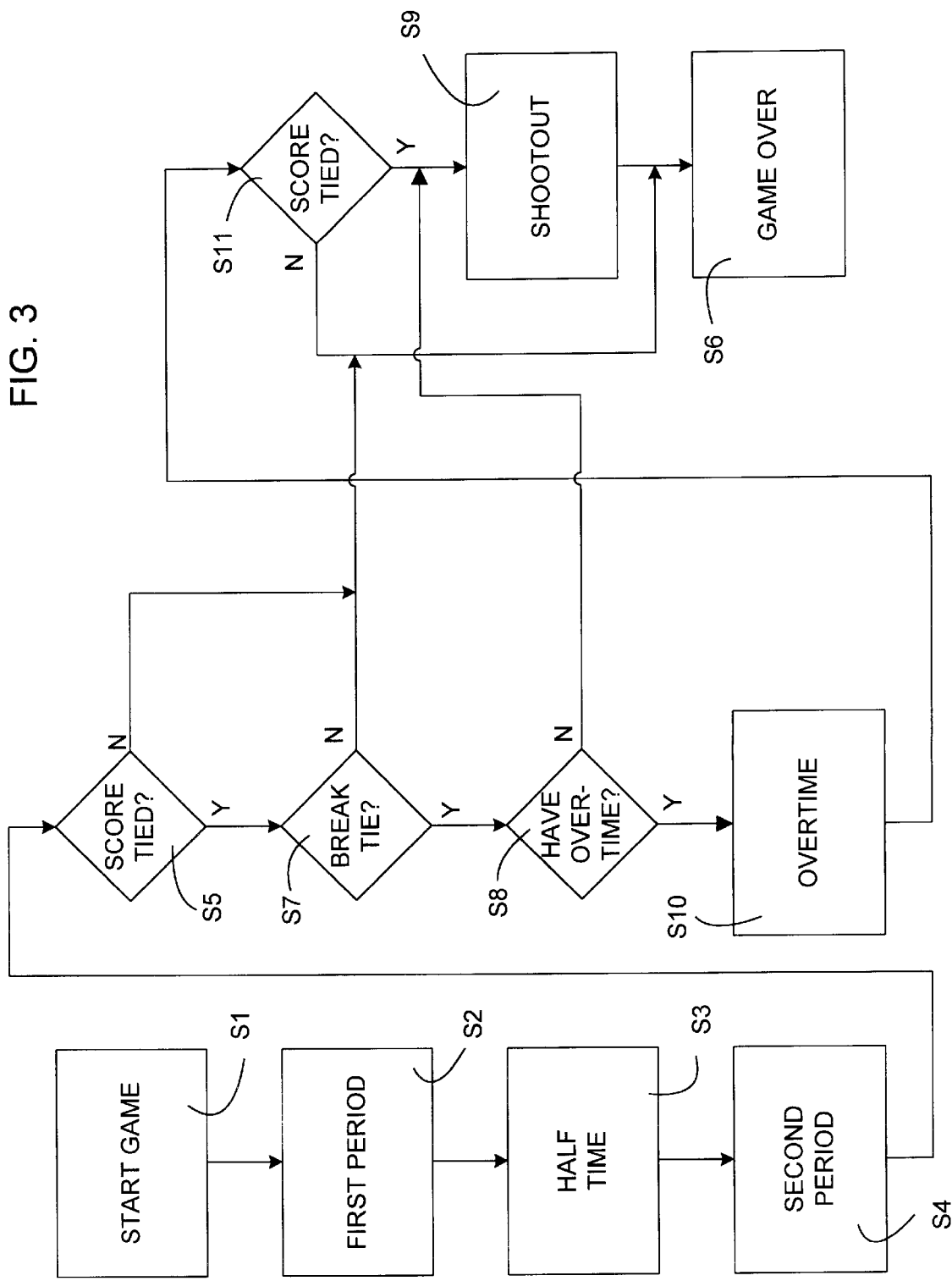
FIG. 3 is a flowchart of a typical soccer game.

FIG. 3 is a flowchart of a typical soccer game. The game starts in a step S1 and continues in step S2 with a first period. After a half-time interval S3, the game continues in step S4 with a second period. At the end of the second period, which corresponds with the end of the regulation time for the game, it is determined in step S5 whether the score of the game is tied. If not, then the game comes to end in step S6. However, if in step S5 it is determined that the score is tied, then in step S7 it is determined whether the tie is to be broken. If not, then the game ends in step S6. If the tie is to be broken, then in step S8, it is determined whether an overtime period is to be played. If not, then the game proceeds to a shootout in step S9. If an overtime period is to be played, the game proceeds to that overtime period in step S10. After the overtime, it is determined in step S11 whether the score is still tied. If not, then the game ends in step S6. If in step S11 it is determined that the score is tied, then the game proceeds to the shootout in step S9. In the step S9 shootout following either step S8 or step S11, the shootout continues until the tie is broken, and the game then ends in step S6.

Figure 4:
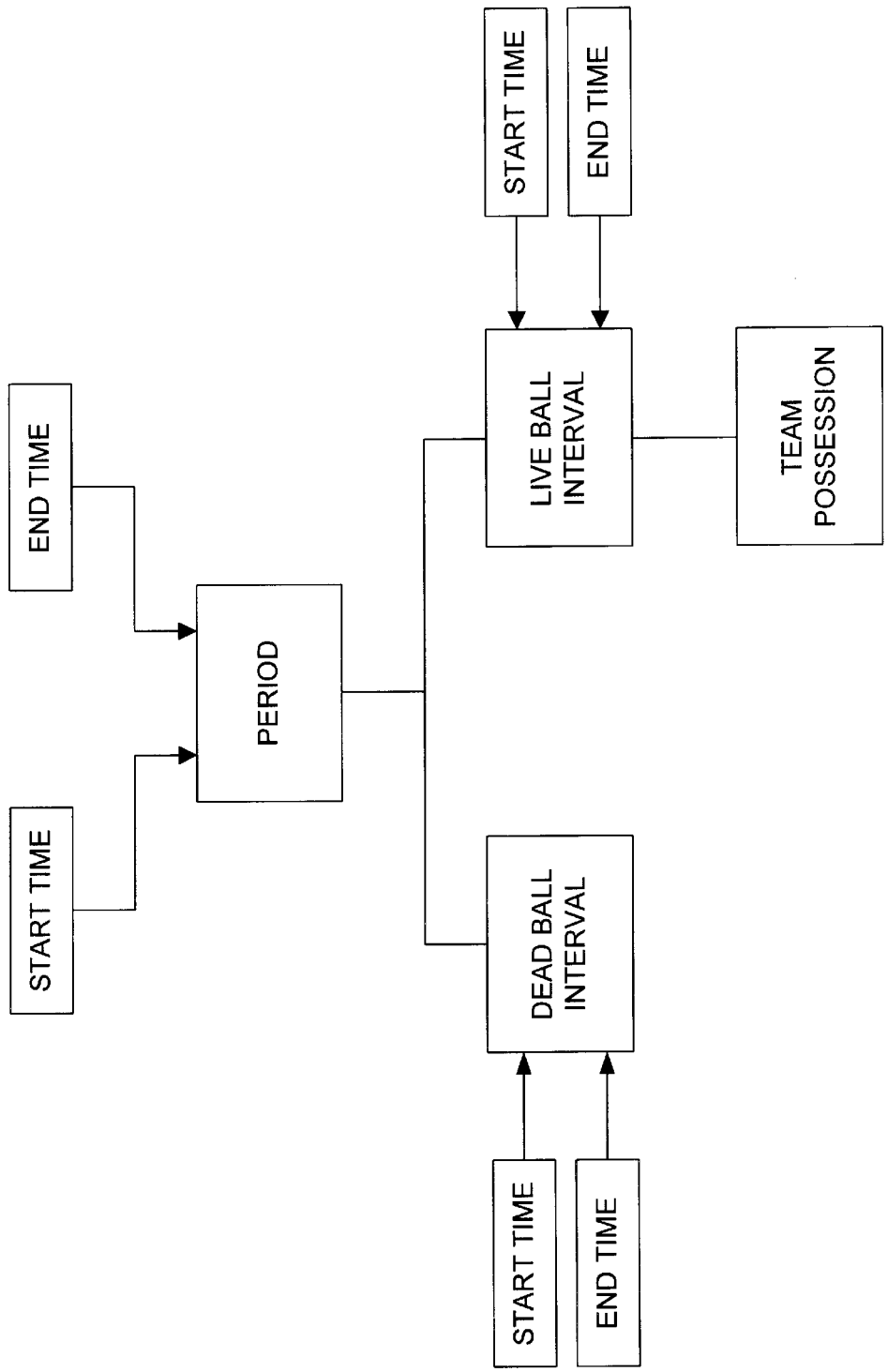
FIG. 4 is a block diagram of intervals within a period of a soccer game.

FIG. 4 is a block diagram of intervals within any of the first period, second period, and overtime period of a soccer game. Each period has a start time and an end time. These are times to as measured from the start of the game in step S1 of FIG. 3, thus enabling the viewer to locate particular segments of the recorded game based on the elapsed time since the start of the game, if desired. Each period of the game is made up of live ball intervals and dead ball intervals. During live ball intervals action is taking place, and one or the other of the teams participating in the game has possession of the ball. Each live ball interval has a start time and an end time. The first live ball interval start time, of course, coincides with the start of the game in step S1 of FIG. 3. Dead ball intervals occur when some action necessitates a stop in play, for example, an injury to a player or a foul. Each dead ball interval likewise has a start time and an end time. Each dead ball interval starts at the end time of the immediately preceding live ball interval and ends at the start time at the immediately succeeding live ball interval.

Figure 5:
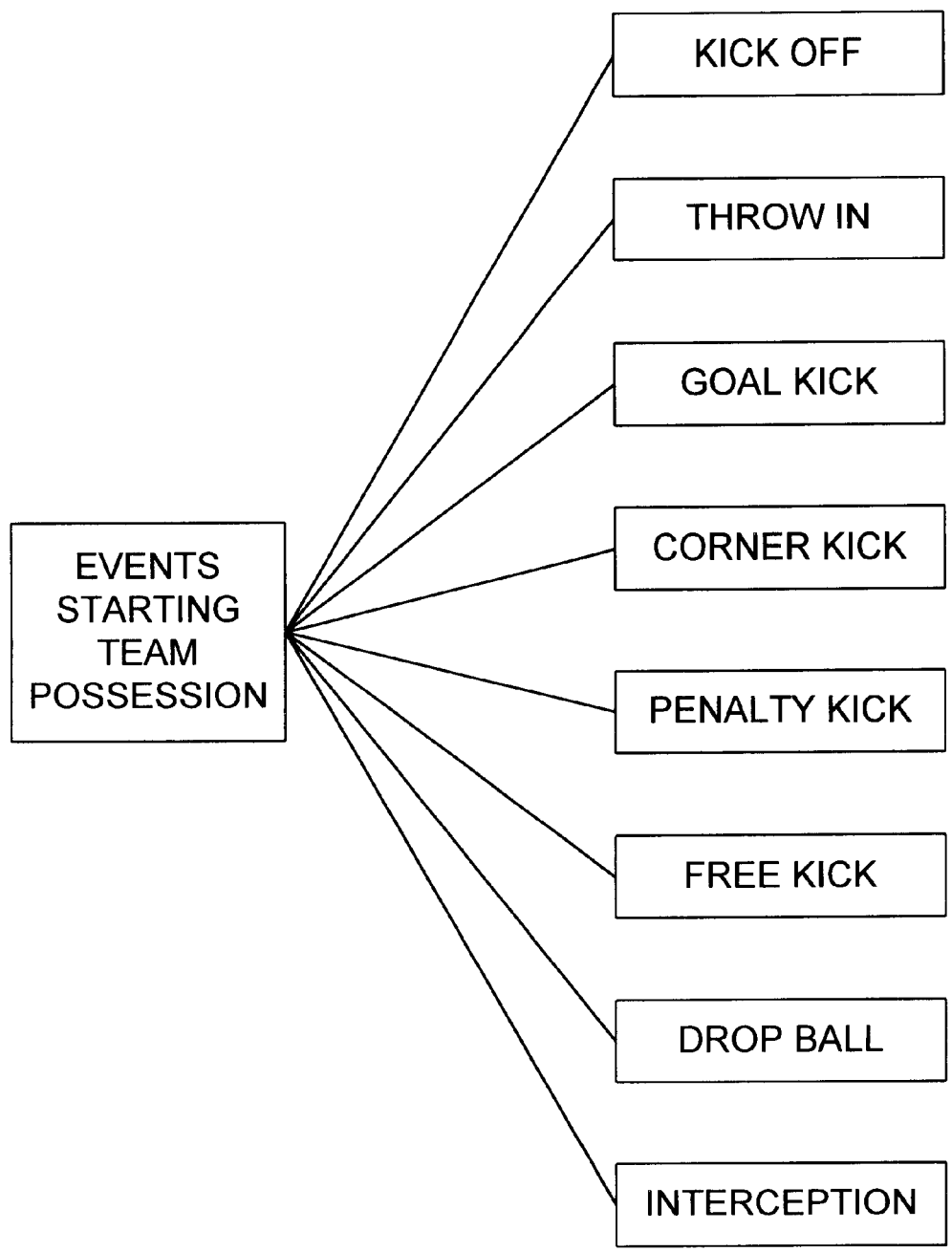
FIG. 5 is a block diagram of representative types of action that might start a series of team possession segments within a soccer game.

FIG. 5 is a block diagram showing some of the various types of events that might start a team possession during a live ball interval. These include kick offs, throw-ins which occur after a ball has gone out of bounds across a side line, goal kicks and corner kicks which occur after a ball has gone out of bounds over an end line, penalty kicks, free kicks, and drop balls and interceptions which occur when a player on one team attempts to pass the ball to another player on the same team, but instead a player from the opposing team intercepts the pass. Other events might also occur.

Figure 6:
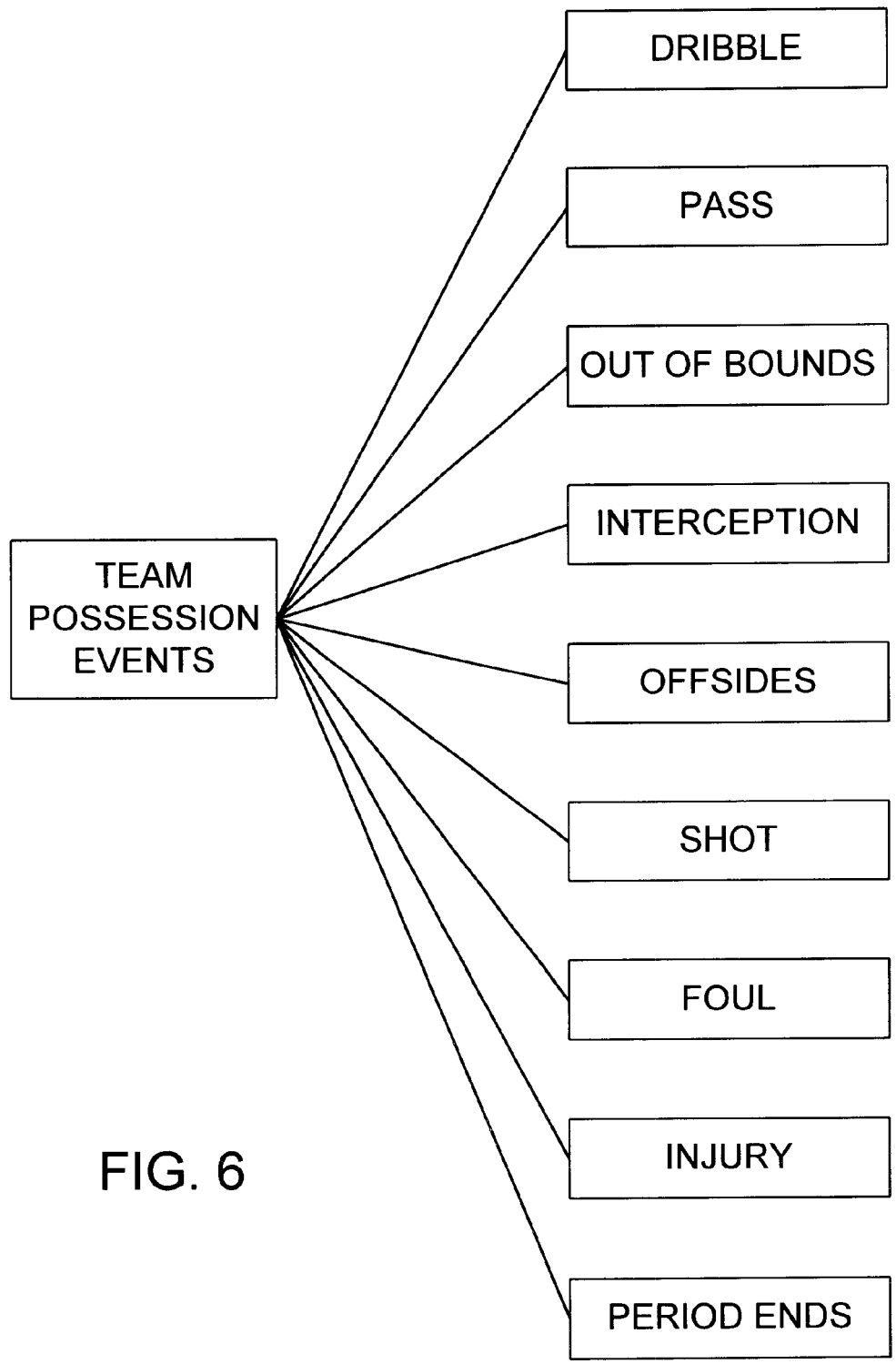
FIG. 6 is a block diagram of representative types of segments that might occur during a team possession in a soccer game.

FIG. 6 is a block diagram showing various events that might occur during a team possession. These include a player dribbling the ball, a player passing the ball, the ball going out of bounds, a pass being intercepted, a team being offside, a shot at the goal, a foul being committed, an injury to a player, and the end of the game period. Again, other events might also occur. When a shot at the goal occurs, it might lead to the scoring of a goal, a save in which the goal keeper of the defending team catches the ball, a deflection in which the ball is blocked by the goal keeper or another player, or the ball missing the goal and going out of bounds. Following a save, the goal keeper either throws the ball or kicks the ball back into play. After a deflection, the ball might be recovered by either an attacking player or a defending player. If the ball misses the goal and goes out of bounds over the end line, the defending team makes a goal kick. Each of the events depicted in FIG. 5 and FIG. 6 involves information as to the player or players involved, the location or locations, and the time. Some of this information will always be the same for events of a specific type. For example, kick offs always commence at the center of the field. On the other hand, an interception involves a passing player, an intercepting player, a start location, an end location, a start time, and an end time.

FIG. 7 is a flowchart illustrating a method of providing a description of sports contents in accordance with a preferred embodiment of the present invention. In a step S21, characteristics of a particular game are recorded. As indicated above, these characteristics might include the type of sports event, such as a soccer game, a baseball game, a football game, a basketball game, a hockey game, etc., as well as characteristics of the teams participating in the event, such as team names, uniform colors, names of the players on each team together with their uniform numbers, and a description of the field on which the event is played. In step S22, characteristics of various types of data that might be included in the event are recorded. The characteristics recorded in steps S21 and S22, make up the sports events models which are applied to description generator 10. A particular sports event, such as a particular soccer game, is then recorded in step S23.

When a viewer wishes to obtain data of a particular type from recorded sports events, the viewer utilizes interactive receiver 14 to select the type of data to be viewed in step S24. In step S25, server 12 locates and, collects data of the selected type, for example by monitoring the relationship between one or more players and the ball, and in step S26 display device 14 displays the selected data. In a soccer game, an event such as a kick off can be identified by detection of the ball stationary at the center of the field, and then detection of a player approaching and reaching the ball, followed by the ball moving rapidly down the field away from the player. By coordinating the relationship between the ball and the players, various types of events can be identified. In addition, by detection of the ball in relation to specific parts of a player, such as the player's arms moving overhead while holding the ball, which would indicate of a throw-in, or detection of a player's feet moving down the field with the ball, which would be indicative of dribbling, different types of segments can be identified. Thus, the time, player and location information enables locating of segments of a selected type.

When the viewer wishes to view a display of sports events, a video record of the sports event has been recorded in step S23, and in step S27 the viewer utilizes interactive receiver 14 to select the types of segments to be viewed. Thus, the viewer might select to watch a specific game or games involving a specific team or a specific player. Likewise, the viewer might select to watch replays of goals scored in soccer games, regardless of the particular game, team, or players involved. Alternatively, the viewer might select to watch any other type of segments. The types of segments that are available from a soccer game might be any of those shown in FIGS. 5 and 6, for example. In a step S28, server 12 locates segments of the selected type, and in step S29, the located segments are displayed on display device 14.

Appendix A specifies a preferred schema for describing a soccer game and its segments. The schema is written in the XML Schema definition language described, for example, in "XML Schema Part 1: Structures," W3C Working Draft 7 April 2000, http: /www.w3.org/TR/xmlschema-1/ and "XML Schema Part 2: Datatypes," W3C WorkingDraft 7 April 2000http://www.w3.org/TR/xmlschema-2/. This language offers facilities for describing the structure, defining descriptor types, and constraining the contents of XML 1.0 documents. The schema definition language, which is itself represented in XML 1.0, provides a superset of the capabilities found in XML 1.0 document type definitions (DTD).

The schema of Appendix A describes a soccer game in a manner similar to describing a book. Under the Game descriptor, "GeneralInfo" corresponds to information which is typically found on the covers of a book, "Contents" corresponds to a table of contents, "Indices" corresponds to indices, and "Highlights" corresponds to a summary or abstract. The Contents section under the Game descriptor is designed to contain a detailed semantic description of the game in terms of the action which happens during the course of the game. The types of action are grouped in temporal order under each period and shootout session according to the time when they are likely to occur. In other words, the Contents are semantic oriented, not media (video or graphics) oriented. The Segments are described and grouped under Game/Highlights. The Indices/Lists are used as a central placed to gain quick access to descriptions of events, players, etc. New index lists may be added to those existing in the schema.

The schema uses highlights to indicate a time range in a game which contains interesting events. Multiple highlights may be collected for a single game. By watching the segments corresponding to the defined highlights, the user may quickly see the most exciting moments of the game. The schema stores the highlight information under Game/Highlights. A segment is usually referred to as a produced segment or media file. Although this schema assumes that a highlight is always contained within a segment, it does not use or describe segments explicitly. In other words, the schema does not describe information about produced media files. Information regarding which segments of the game are annotated with event information is stored under Game/Contents/AnnotatedTimeInterval.

The method of the present invention thus includes the following: Acquire information about the sport, for example by researching the sport using sources such as official rules, coach manuals, popular statistics for the sport (e.g., from web sites dedicated to the sport), and other literature that describes the sport and helps to interpret the rules. Create a conceptual model of the sport; for example, based on the research, produce lists of objects used in the sport's game (e.g., goal, playing field, etc.), participants (e.g., players, referees), concepts that can be applied to the sport (e.g., goal, overtime, period), and statistics for the sport that would be interesting to the sport's fans, and using the lists, create sport's models (visual diagrams). Using the conceptual model, define a schema of the sport; for example, create sport's schemas in the form of formal descriptions of all the objects and concepts used in the sport. Using the defined schema, generate specific descriptions of specific events; for example, using the sport's schemas, create sport's game descriptions for different games.

While the present invention has been described with reference to a sports event, and in particular a soccer game, the invention can equally well describe and display other types of events, for example entertainment events such as a circus, and political events such as a political convention. Thus, although the invention has been described with reference to exemplary preferred embodiments, various substitutions, rearrangements and alterations can be made, and still the result will be within the scope of the invention.

What is claimed is:

1. A computer implemented method for collecting data about an event comprising:

identifying a plurality of contents within a particular type of event, and a plurality of temporal segments comprising the particular type of event;

generating a semantic model for each of the plurality of contents;

creating a schema for the particular type of event, said schema comprising an association of the plurality of semantic models to one or more of the plurality of temporal segments in which the semantic models may occur; and annotating event segments of a recording of an event of the particular event type with semantic annotations based on the schema.

2. The method of claim 1 wherein annotating the recording comprises:

identifying the event segments in the recording that correspond to the plurality of temporal segments in the schema;

identifying, for each event segment, event contents that correspond to the semantic models associated with the given temporal segment by the schema; and recording the semantic models identified for each event segment.

3. The method of claim 1 further comprising:

receiving an indication of a particular semantic model from among the plurality of semantic models;

searching the semantic annotations for the particular semantic model; and providing any event segments annotated with the particular semantic model.

4. The method of claim 1 further comprising:

receiving an indication of a particular semantic model from among the plurality of semantic models;

searching the semantic annotations for the particular semantic model; and compiling a statistical output corresponding to the particular semantic model based on any event segments annotated with the particular semantic model.

5. The method of claim 1 wherein the event comprises a sports game.

6. The method of claim 1 wherein the particular type of event comprises a type of sports.

7. The method of claim 1 wherein the plurality of contents include at least one of a ball, a field, a goal, a player, a kick-off, a shootout, and a team.

8. A machine readable medium having stored thereon machine executable instructions for collecting data about an event, the execution of which to implement a method comprising:

identifying a plurality of contents within a particular type of event, and a plurality of temporal segments comprising the particular type of event;

generating a semantic model for each of the plurality of contents;

creating a schema for the particular type of event, said schema comprising an association of the plurality of semantic models to one or more of the plurality of temporal segments in which the semantic models may occur; and annotating event segments of a recording of an event of the particular event type with semantic annotations based on the schema.

9. The machine readable medium of claim 8 wherein annotating the recording comprises:

identifying the event segments in the recording that correspond to the plurality of temporal segments in the schema;

identifying, for each event segment, event contents that correspond to the semantic models associated with the given temporal segment by the schema; and recording the semantic models identified for each event segment.

10. The machine readable medium of claim 8, the method further comprising:

receiving an indication of a particular semantic model from among the plurality of semantic models;

searching the semantic annotations for the particular semantic model; and providing any event segments annotated with the particular semantic model.

11. The machine readable medium of claim 8, the method further comprising:

receiving an indication of a particular semantic model from among the plurality of semantic models;

searching the semantic annotations for the particular semantic model; and compiling a statistical output corresponding to the particular semantic model based on any event segments annotated with the particular semantic model.

12. The machine readable medium of claim 8 wherein the event comprises a sports game.

13. The machine readable medium of claim 8 wherein the particular type of event comprises a type of sports.

14. The machine readable medium of claim 8 wherein the plurality of contents include at least one of a ball, a field, a goal, a player, a kick-off, a shoot-out, and a team.

* * * * *